(12) United States Patent
Malyugin et al.

(10) Patent No.: US 10,203,901 B2
(45) Date of Patent: *Feb. 12, 2019

(54) TRANSPARENT HARDWARE-ASSISTED MEMORY DECOMPRESSION

(71) Applicant: Google LLC, Mountain View, CA (US)

(72) Inventors: Vyacheslav Malyugin, Los Gatos, CA (US); Luigi Semenzato, Oakland, CA (US); Choon Ping Chng, Sunnyvale, CA (US); Santhosh Rao, San Francisco, CA (US); Shinye Shiu, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,417

(22) Filed: Nov. 21, 2017

(65) Prior Publication Data
US 2018/0095668 A1 Apr. 5, 2018

Related U.S. Application Data

(63) Continuation of application No. 15/043,023, filed on Feb. 12, 2016, now Pat. No. 9,864,541.
(Continued)

(51) Int. Cl.
*G06F 3/06* (2006.01)
*G06F 12/02* (2006.01)
(Continued)

(52) U.S. Cl.
CPC ............ *G06F 3/064* (2013.01); *G06F 3/0604* (2013.01); *G06F 3/0631* (2013.01);
(Continued)

(58) Field of Classification Search
CPC ...... G06F 3/0604; G06F 3/0631; G06F 3/064; G06F 3/0673; G06F 12/023;
(Continued)

(56) References Cited

U.S. PATENT DOCUMENTS 5,392,445 A * 2/1995 Takamoto ........... G06F 11/1435
   711/113
6,028,725 A * 2/2000 Blumenau ............. G06F 3/0613
   360/48
(Continued)

FOREIGN PATENT DOCUMENTS

WO 2014049636 4/2014
WO 2016130915 8/2016

OTHER PUBLICATIONS

E2MC: Entropy Encoding Based Memory Compression for GPUs; Lal et al; 2017 IEEE International Parallel and Distributed Processing Symposium; May 29, 2017-Jun. 2, 2017; pp. 1119-1128 (10 pages) (Year: 2017).*
(Continued)

Primary Examiner — Daniel C Chappell
(74) Attorney, Agent, or Firm — Colby Nipper (57) ABSTRACT

Provided are methods and systems for memory decompression using a hardware decompressor that minimizes or eliminates the involvement of software. Custom decompression hardware is added to the memory subsystem, where the decompression hardware handles read accesses caused by, for example, cache misses or requests from devices to compressed memory blocks, by reading a compressed block, decompressing it into an internal buffer, and returning the requested portion of the block. The custom hardware is designed to determine if the block is compressed, and determine the parameters of compression, by checking unused high bits of the physical address of the access. This allows compression to be implemented without additional metadata, because the necessary metadata can be stored in unused bits in the existing page table structures.

20 Claims, 6 Drawing Sheets

Related U.S. Application Data (60) Provisional application No. 62/116,053, filed on Feb. 13, 2015.

(51) Int. Cl.
*G06F 12/0804* (2016.01)
*G06F 12/0871* (2016.01)
*G06F 12/0888* (2016.01)

(52) U.S. Cl.
CPC ......... *G06F 3/0673* (2013.01); *G06F 12/023* (2013.01); *G06F 12/0888* (2013.01); *G06F 12/0804* (2013.01); *G06F 12/0871* (2013.01); *G06F 2003/0691* (2013.01); *G06F 2212/401* (2013.01); *Y02B 70/30* (2013.01); *Y02D 10/13* (2018.01)

(58) Field of Classification Search
CPC ............. G06F 12/0804; G06F 12/0871; G06F 12/0888; G06F 2003/0691; G06F 2212/401; Y02B 60/1225
See application file for complete search history.

(56) References Cited

U.S. PATENT DOCUMENTS

| | | | | |
|---|---|---|---|---|
| 6,067,199 | A * | 5/2000 | Blumenau | G06F 3/061 360/48 |
| 6,092,071 | A * | 7/2000 | Bolan | G06F 3/0608 |
| 6,170,047 | B1 * | 1/2001 | Dye | G06F 12/08 345/531 |
| 6,173,381 | B1 * | 1/2001 | Dye | G06F 12/08 345/555 |
| 6,370,631 | B1 | 4/2002 | Dye | |
| 6,564,305 | B1 * | 5/2003 | Moore | G06F 12/08 358/1.15 |
| 6,829,691 | B2 * | 12/2004 | Wilson | G06F 12/08 711/154 |
| 6,877,081 | B2 * | 4/2005 | Herger | G06F 12/08 710/56 |
| 6,879,266 | B1 * | 4/2005 | Dye | G06F 12/08 341/51 |
| 6,968,424 | B1 * | 11/2005 | Danilak | G06F 12/0866 711/113 |
| 7,047,382 | B2 | 5/2006 | Geiger et al. | |
| 7,433,994 | B2 * | 10/2008 | Petersen | G06F 12/0866 711/103 |
| 7,437,364 | B1 * | 10/2008 | Fredricksen | G06F 17/30011 |
| 7,610,541 | B2 | 10/2009 | Tremaine et al. | |
| 8,176,288 | B2 | 5/2012 | Dye | |
| 8,473,673 | B2 * | 6/2013 | Gaither | G06F 12/023 710/35 |
| 8,711,164 | B2 | 4/2014 | Dye | |
| 9,864,541 | B2 * | 1/2018 | Malyugin | G06F 12/023 |
| 9,965,210 | B2 * | 5/2018 | Alves | G06F 3/0604 |
| 2006/0271761 | A1 | 11/2006 | Riemens | |
| 2008/0059728 | A1 * | 3/2008 | Daly | G06F 12/08 711/158 |
| 2014/0258247 | A1 | 9/2014 | Chu et al. | |
| 2015/0193342 | A1 * | 7/2015 | Ohara | G06F 12/0873 711/120 |
| 2016/0098356 | A1 * | 4/2016 | Shiu | G06F 3/061 711/133 |
| 2016/0239209 | A1 | 8/2016 | Malyugin et al. | |

OTHER PUBLICATIONS

Empirical study of memory-data: characteristics and compressibility; Kjelso et al; IEE Proceedings—Computers and Digital Techniques, vol. 145, iss. 1; Jan. 1998; pp. 63-67 (5 pages) (Year: 1998).*
Procedure based program compression; Kirovski et al; Proceedings of the 30th annual ACM/IEEE international symposium on Microarchitecture; Dec. 1-3, 1997; pp. 204-213 (10 pages) (Year: 1997).*
"First Action Interview Office Action", U.S. Appl. No. 15/043,023, dated Jul. 26, 2017, 5 pages.
"International Search Report and Written Opinion", Application No. PCT/US2016/017745, dated May 18, 2016, 12 pages.
"Notice of Allowance", U.S. Appl. No. 15/043,023, dated Sep. 6, 2017, 7 pages.
"Notice of Allowance", U.S. Appl. No. 15/043,023, dated Oct. 25, 2017, 8 pages.
"Pre-Interview Communication", U.S. Appl. No. 15/043,023, dated Apr. 27, 2017, 3 pages.
"Written Opinion", PCT Application No. PCT/US2016/017745, dated Aug. 15, 2017, 7 pages.
Kirovski, et al., "Procedure Based Program Compression", Proceedings of the 30th annual ACM/IEEE international symposium on Microarchitecture, Jan. 1-3, 1997, 10 pages.
Kjelso, et al., "Empirical study of memory-data: Characteristics and compressibility", IEEE Proceedings—Computers and Digital Techniques, vol. 145, iss. 1, Jan. 1998, 5 pages.
Lal, et al., "E2MC: Entropy Encoding Based Memory Compression for GPUs", IEEE International Parallel and Distributed Processing Symposium, May 29, 2017-Jun. 2, 2017, 10 pages.

* cited by examiner

FIG. 6

TRANSPARENT HARDWARE-ASSISTED MEMORY DECOMPRESSION

PRIORITY

This application is a continuation of and claims priority to U.S. patent application Ser. No. 15/043,023 filed Feb. 12, 2016 and issued as U.S. Pat. No. 9,864,541 on Jan. 9, 2018, which, in turn, claims priority to U.S. Provisional Patent Application Ser. No. 62/116,053, filed Feb. 13, 2015, the entire disclosures of which are hereby incorporated by reference.

BACKGROUND

Computers frequently operate with smaller amounts of RAM (random-access memory) than the total memory used by all programs. One of the various techniques to achieve this result includes compressing memory that has not been accessed recently, and decompressing such memory when it is accessed. Decompressing memory using only software is costly for a number of reasons including, for example, (i) the involvement of a kernel page fault handler, swap-related software layers, and software compressor/decompressor; (ii) a need to store memory blocks uncompressed, thereby forcing other memory blocks to be compressed or evicted, which causes additional energy consumption and potentially triggers thrashing behavior in a system (e.g., when memory is compressed and decompressed all the time with very little user-visible progress); and (iii) a need to write entire uncompressed memory blocks back to RAM, thus increasing the memory bus contention and the energy consumption of RAM.

Existing software memory compression schemes suffer from the problems (i)-(iii) described above. While some hardware-based blocks performing compression and decompression exist, such compressor-decompressor blocks are not capable of transparently handling cache line misses, and therefore still suffer from problems (ii) and (iii) while also adding hardware overhead for all memory accesses (similar to problem (i)).

Various approaches for software and hardware memory deduplication serving the same or similar high-level goals have been proposed over time. Deduplication saves space by detecting and sharing blocks of memory with the same content, as opposed to compression that instead reduces the space needed to store blocks. However, such software deduplication approaches suffer from problems (i)-(iii) described above, while existing hardware deduplication is generally done at small granularity (e.g., cache lines), causing high metadata overhead. Existing hardware as well as software deduplication schemes requires the computation-intensive, space-intensive, and energy-intensive process of finding blocks with duplicate content.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for memory decompression. More specifically, aspects of the present disclosure relate to decompressing memory using a hardware decompressor designed to minimize or eliminate software involvement.

One embodiment of the present disclosure relates to a hardware decompressor comprising a hardware device disposed between a processing unit and a physical computer memory, where the hardware device is configured to: receive a memory access read request, the received request causing a cache miss or page fault; determine whether data requested by the memory access read request is in a compressed memory block; responsive to a determination that the data requested by the memory access read request is not in a compressed memory block, forward the memory access read request to the physical computer memory; responsive to a determination that the data requested by the memory access read request is in a compressed memory block, determine whether the data from the compressed memory block has been previously decompressed and stored in a dedicated storage medium local to the hardware device; responsive to a determination that the data from the compressed memory block is stored in the storage medium, return the data from the storage medium in response to the memory access read request; and responsive to a determination that the data from the compressed memory block is not stored in the storage medium, allocate storage space in the storage medium; read the data from the compressed memory block; decompress the read data from the compressed memory block into the storage medium; and return the decompressed data from the storage medium in response to the memory access read request.

In another embodiment, the hardware device of the decompressor is configured to: read the data from the compressed memory block until the data requested by the memory access read request is located; and decompress the read data from the compressed memory block into the storage medium only to the point where the requested data is fully retrieved.

In another embodiment, the hardware device of the decompressor is configured to determine whether the data requested by the memory access read request is in the compressed memory block by checking unused bits of page table structures that store information about virtual memory pages.

In yet another embodiment, the hardware device of the decompressor is configured to selectively alternate between a full memory decompression mode and a partial memory decompression mode.

In still another embodiment, the hardware device of the decompressor is configured to alternate between the full memory decompression mode and the partial memory decompression mode based on one or more performance parameters of a device or program associated with the received memory access read request.

In another embodiment, the hardware device of the decompressor is configured to alternate between the full memory decompression mode and the partial memory decompression mode based on a signal received from a device or program associated with the received memory access read request.

Another embodiment of the present disclosure relates to a method for memory decompression, the method comprising: receiving a memory access read request, the received request causing a cache miss or page fault to occur; determining whether data requested by the memory access read request is in a compressed memory block; in response to determining that the data requested by the memory access read request is not in a compressed memory block, sending the memory access read request to a physical computer memory; in response to determining that the data requested by the memory access read request is in a compressed memory block, determining whether the data from the compressed memory block has previously been decompressed by a hardware decompression device and stored in a dedicated storage medium local to the hardware decompression device; in response to determining that the data from the compressed memory block is stored in the dedicated storage medium local to the hardware decompression device, returning the data from the storage medium in response to the received memory access read request; and in response to determining that the data from the compressed memory block is not stored in the dedicated storage medium local to the hardware decompression device, allocating storage space in the storage medium local to the hardware decompression device; reading the data from the compressed memory block; decompressing the read data from the compressed memory block into the storage medium local to the hardware decompression device; and returning the decompressed data from the storage medium in response to the memory access read request.

In another embodiment, the method for memory decompression further comprises: reading the data from the compressed memory block until the data requested by the memory access read request is located; and decompressing the read data from the compressed memory block into the storage medium local to the hardware decompression device only to the point where the requested data is fully retrieved.

In another embodiment, the method for memory decompression further comprises determining whether the data requested by the memory access read request is in the compressed memory block by checking unused bits of page table structures that store information about virtual memory pages.

In yet another embodiment, the method for memory decompression further comprises selectively alternating between a full memory decompression mode and a partial memory decompression mode.

Yet another embodiment of the present disclosure relates to a system for memory decompression, the system comprising system memory; at least one processor coupled to the system memory; and a non-transitory computer-readable medium associated with the at least one processor, the non-transitory medium having instructions stored thereon that, when executed by the at least one processor, causes the at least one processor to: receive a memory access read request, the received request causing a cache miss or page fault to occur; determine whether data requested by the memory access read request is in a compressed memory block; in response to determining that the data requested by the memory access read request is not in a compressed memory block, send the memory access read request to a physical computer memory; in response to determining that the data requested by the memory access read request is in a compressed memory block, determine whether the data from the compressed memory block has previously been decompressed and stored in a storage medium local to the at least one processor; in response to determining that the data from the compressed memory block is stored in the storage medium, return the data from the storage medium in response to the received memory access read request; and in response to determining that the data from the compressed memory block is not stored in the storage medium, allocate storage space in the storage medium; read the data from the compressed memory block; decompress the read data from the compressed memory block into the storage medium; and return the decompressed data from the storage medium in response to the memory access read request.

In one or more other embodiments, the methods and systems described herein may optionally include one or more of the following additional features: the hardware decompression device is disposed between a last level cache of a processing unit and the physical computer memory; the alternation between the full memory decompression mode and the partial memory decompression mode is based on one or more performance parameters of a device or program associated with the received memory access read request; and/or the alternation between the full memory decompression mode and the partial memory decompression mode is based on a signal received from a device or program associated with the received memory access read request.

It should be noted that embodiments of some or all of the processor and memory systems disclosed herein may also be configured to perform some or all of the method embodiments disclosed above. In addition, embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF THE DRAWINGS

These and other objects, features, and characteristics of the present disclosure will become more apparent to those skilled in the art from a study of the following Detailed Description in conjunction with the appended claims and drawings, all of which form a part of this specification. In the drawings:

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

As described above, many existing memory decompression approaches are based only on software, and thus suffer from a number of problems (e.g., problems (i)-(iii) described above) that result in increased energy consumption and reduced execution speed of programs, and their associated costs.

One or more embodiments of the present disclosure relate to a method and system for memory decompression that eliminates the disadvantages associated with existing techniques by adding custom hardware to the memory subsystem. As will be described in greater detail below, the custom hardware handles read accesses caused by, for example, cache misses or requests from devices (e.g., graphics processing unit (GPU)) to compressed memory blocks, by reading a compressed block, decompressing it into an internal buffer, and returning the requested portion of the block.

In accordance with at least one embodiment, the custom hardware is designed or otherwise configured to determine if the block is compressed (and determine the parameters of compression) by checking unused high bits of the physical address of the access. Such an embodiment allows compression to be implemented without additional metadata, because the necessary metadata can be stored in unused bits in the existing page table structures.

In accordance with one or more embodiments of the present disclosure, the hardware may optionally cache uncompressed block images in the internal buffers using, for example, most recently used or some other replacement policy. This reduces the bandwidth and energy required by the hardware decompressor to read the compressed block images, and also reduces the energy used by the custom hardware to decompress the blocks.

The advantages over existing techniques described above can be realized using a hardware scheme that allows memory blocks to be decompressed without software involvement, as in accordance with one or more embodiments of the present disclosure. The custom hardware described herein is capable of such a solution.

Figure 1:
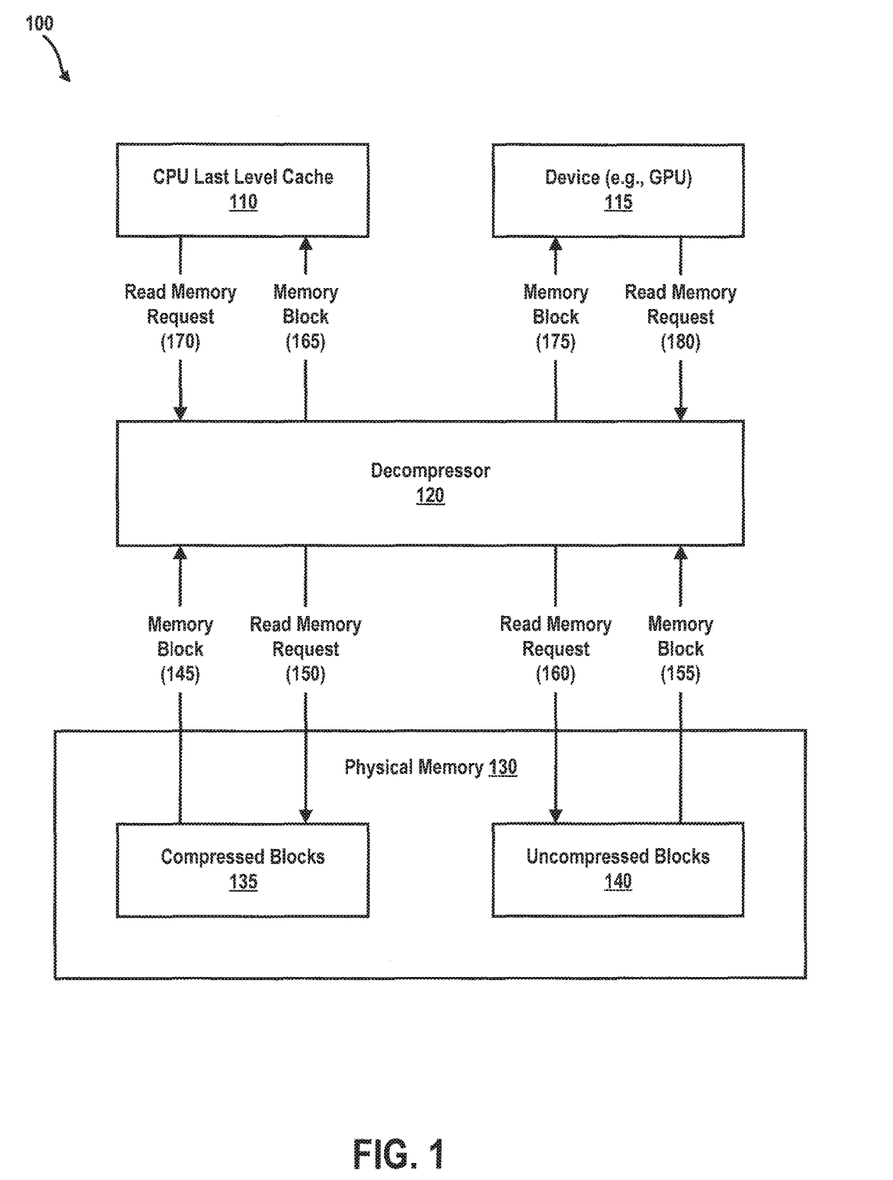
FIG. 1 is a block diagram illustrating an example system for hardware-assisted memory decompression according to one or more embodiments described herein.

FIG. 1 is an example system for hardware-assisted memory decompression. In accordance with one or more embodiments of the present disclosure, the system 100 (which may be a memory subsystem) may include a custom hardware decompressor 120 specifically designed or configured for decompressing memory blocks while minimizing (or eliminating) any involvement of associated decompression software.

The decompressor 120 may receive read memory requests (170, 180) from a CPU last level cache 110_-and/or one or more devices 115 (e.g., GPU), where the read memory requests (170, 180) are requests for access to portions of physical memory 130. The decompressor 120 may analyze the read memory requests (170, 180) received from the CPU last level cache 110 and/or device 115 to determine whether the requests are for access to compressed blocks 135 or uncompressed blocks 140 of the physical memory 130. For example, if the decompressor 120 determines that access to a compressed block 135 is not needed for a given read request, the decompressor 120 may bypass the memory read request (160) to the physical memory 130 (e.g., the memory read request may be passed, for example, to the memory controller), retrieve or otherwise obtain the requested uncompressed memory block (155) from the physical memory 130, and provide the requested memory block (165, 175) to the requestor (e.g., CPU last level cache 110 or device 115).

In another example, if the decompressor 120 determines, based on analyzing a given read request (170, 175) that access to a compressed block 135 of the physical memory 130 is needed for the read request, the decompressor 120 may use the read request (150) to fetch the requested compressed block (145) from the physical memory 130, decompress the compressed block, and provide the requested memory block (165, 175) to the requestor (e.g., CPU last level cache 110 or device 115).

While in at least one embodiment of the present disclosure the decompressor 120 (which may, for example, be a hardware decompressor) may be disposed between the last level cache of the CPU 110 or the device 115, and the physical memory 130, it should be noted that some CPUs or devices do not have any caches, or may perform accesses bypassing caches. As such, in accordance with one or more other embodiments, when reference is made herein to a request from a last level cache, it should be understood to also describe devices and CPUs that may not have caches, or that may be capable of bypassing such caches, and thus 110 can be a processor, or processor device such as a microcontroller, or other device that makes read memory requests.

Figure 2:
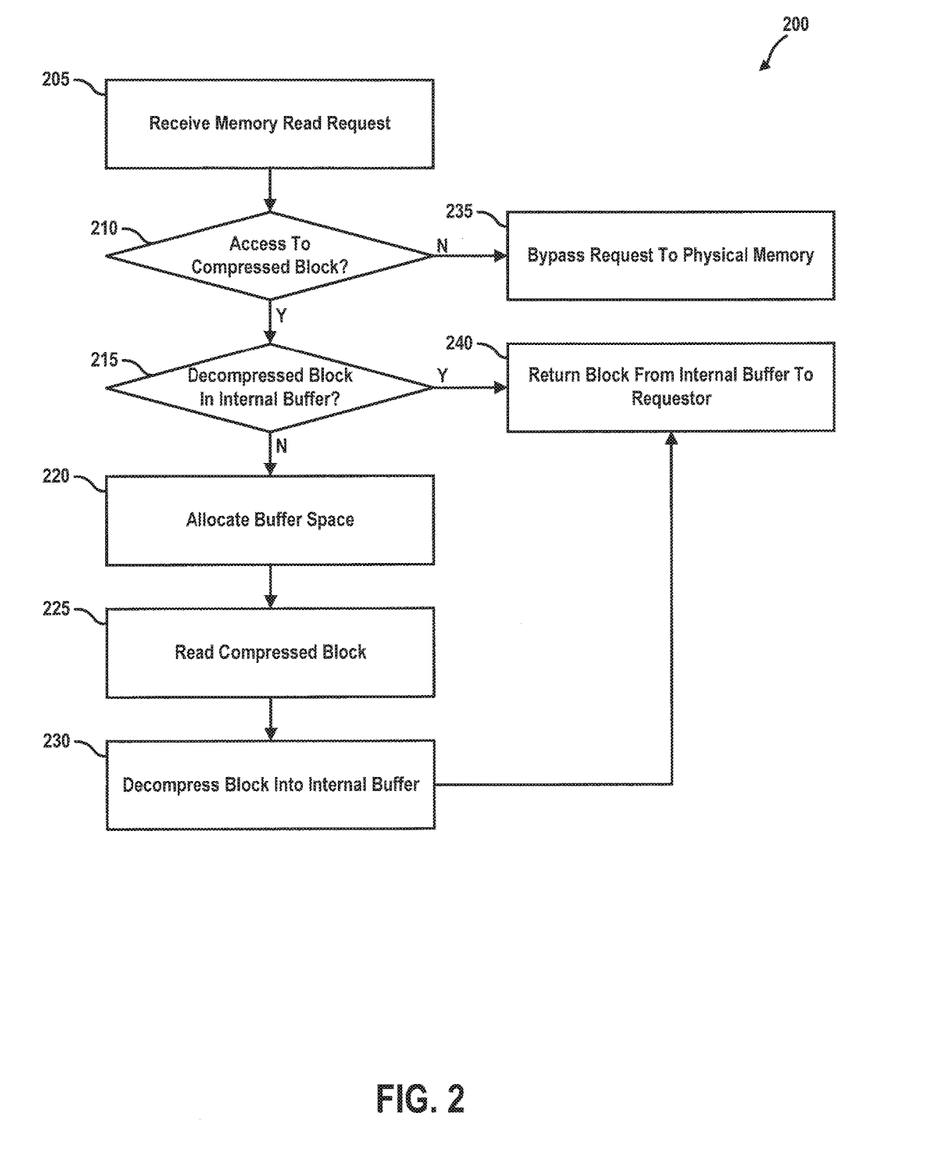
FIG. 2 is a flowchart illustrating an example method for memory decompression using customized decompression hardware according to one or more embodiments described herein.

FIG. 2 illustrates an example process 200 for memory decompression using decompression hardware specifically designed to obviate the need for software involvement. In accordance with one or more embodiments described herein, blocks 205-240 in the example method 200 for memory decompression may be performed by custom decompression hardware (e.g., decompressor 120 in the example system 100 shown in FIG. 1).

At block 205, the hardware may receive a memory read request, and at block 210 the hardware may analyze read accesses to determine whether the requested access is to a compressed block of memory. If it is determined at block 210 that access is to a block of memory that was not compressed, at block 235 the hardware may bypass the memory read request to the physical memory (e.g., the memory read request may be passed to the memory controller). On the other hand, if it is determined at block 210 that the requested access is to a compressed block of memory, the decompression hardware may start the process of handling access to the compressed block (e.g., blocks 215-230).

For example, in accordance with at least one embodiment, the decompression hardware may analyze the read accesses (e.g., at block 210) by checking high-order bits that otherwise would be unused because they refer to physical memory that is not mapped to any RAM or physical devices. If the high order bits indicate that memory is uncompressed, the memory read request may be passed to the memory controller (e.g., at block 235). If the high order bits indicate that access is to a compressed block of memory, then the custom hardware may start the process of handling access to the compressed block (e.g., blocks 215-230).

At block 215, the hardware decompressor may determine whether the decompressed data block (e.g., decompressed image of the block) is in its internal buffer. For example, in accordance with at least one embodiment, the hardware decompressor may optionally cache uncompressed block images in its one or more internal buffers (e.g., using most recently used or some other replacement policy). If the hardware decompressor determines at block 215 that the decompressed block is in the internal buffer, then at block 240 the decompressor may return the requested portion of the decompressed block to the requestor.

If, at block 215, the hardware decompressor determines that the decompressed block is not cached in one of its internal buffers, the decompressor may allocate space in one or more of its internal buffers (at block 220), and, as the hardware reads the compressed image (at block 225), the hardware may decompress the image into its one or more internal buffers (e.g., at block 230).

Once the hardware decompressor determines that the requested portion of the block is decompressed and in its internal buffer (e.g., at block 230), the requested decompressed portion may be returned to the requestor (e.g., at block 240).

Figure 3:
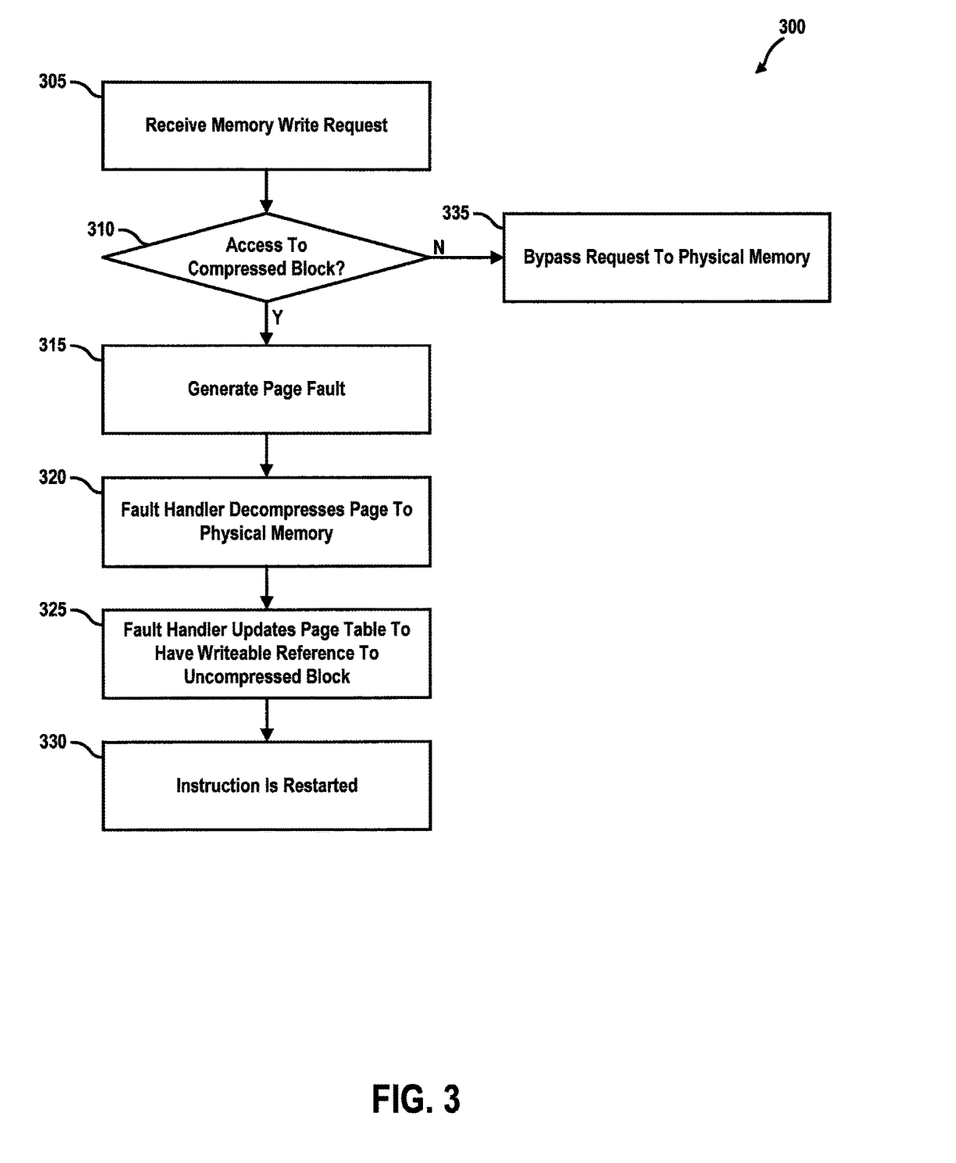
FIG. 3 is a flowchart illustrating an example method for memory compression according to one or more embodiments described herein.

FIG. 3 illustrates an example process 300 for handling a write to memory by CPU or a device, in accordance with one or more embodiments described herein.

At block 305, a memory write request may be received, and at block 310 a determination may be made as to whether the received write request is to compressed data or uncompressed data (e.g., whether or not the received write is to a compressed memory block). In accordance with at least one embodiment, if it is determined at block 310 that the received write is to a memory block that is uncompressed, the write may be bypassed to physical memory (at block 335). On the other hand, if the received write is to a compressed memory block, then in such an embodiment the block has previously been marked as read-only in the page tables of the CPU or device, and on a write, a page fault is generated (at block 315).

The handler of the page fault (generated at block 315) may perform decompression of the block to physical memory (at block 320), update the page table to have a writeable reference to the uncompressed block of memory (at block 325), and restart the write access (at block 330).

Figure 4:
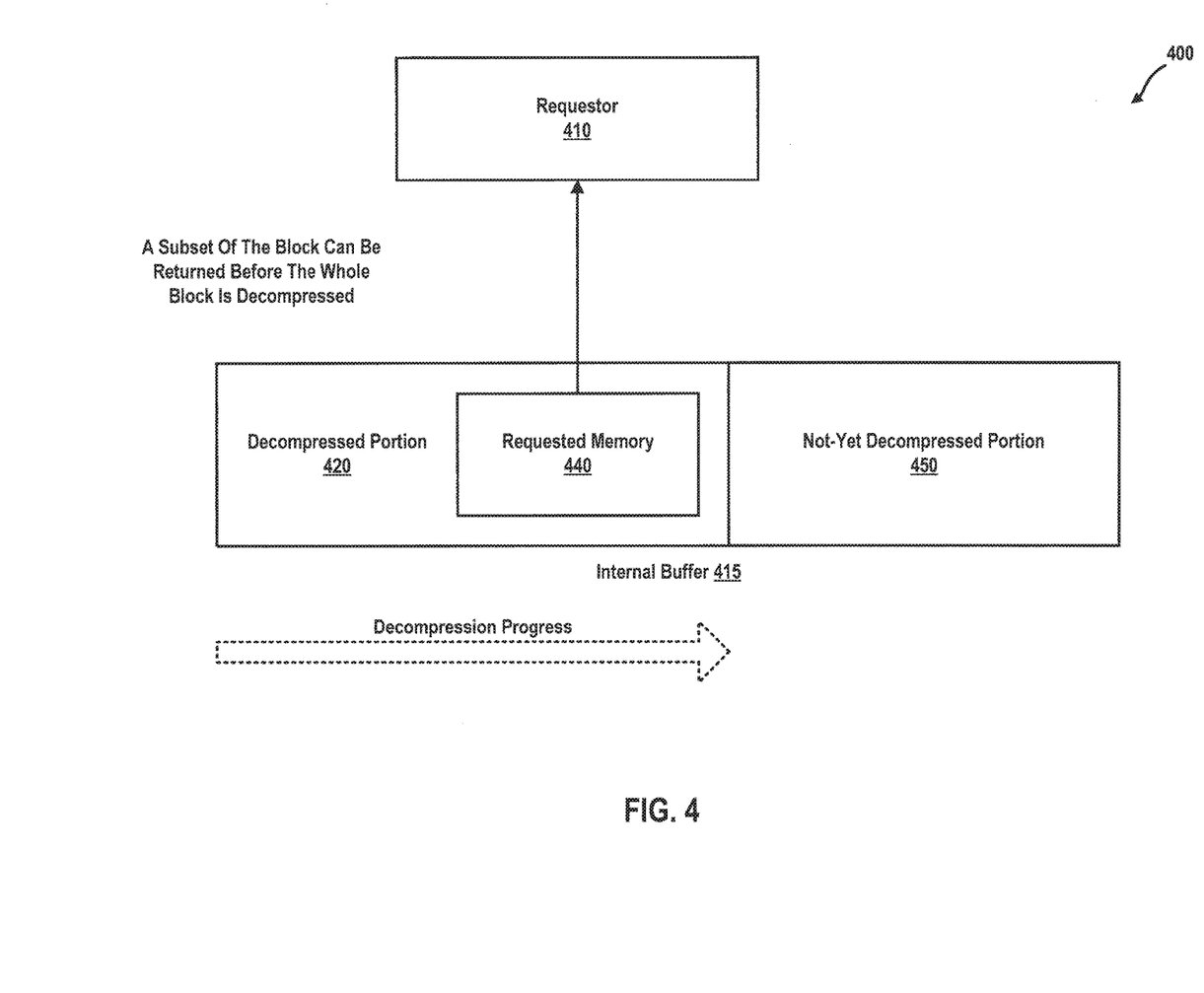
FIG. 4 is a block diagram illustrating an example of partial decompression of a memory block by a hardware decompressor according to one or more embodiments described herein.

FIG. 4 illustrates an example of partial decompression 400 of a memory block by a hardware decompressor. Among other advantages, such partial decompression makes requested memory available before the not-yet-decompressed portion is processed, thereby decreasing latency of access.

In accordance with one or more embodiments described herein, a hardware decompressor (e.g., decompressor 120 in the example system 100 shown in FIG. 1) may be designed or configured to return to a requestor 410 (e.g., a CPU cache or a device such as, for example, CPU last level cache 110 or device 115 in the example system 100 shown in FIG. 1) a requested subset or portion of a memory block 440 before the entire block is decompressed in an internal buffer 415 of the decompressor. In accordance with at least one embodiment, once the requested portion of memory 440 has been decompressed into the internal buffer 415 of the hardware decompressor, the hardware decompressor may continue decompressing the block of memory into the internal buffer 415, or the decompressor may stop with an incomplete decompressed block in the internal buffer 415. For example, the internal buffer 415 may include a decompressed portion 420 of the block and a not-yet decompressed portion 450 of the block.

In accordance with one or more embodiments of the present disclosure, the hardware decompressor may have a selectable or otherwise adjustable or self-adjusting configuration that alternates between full and partial memory decompression (e.g., the hardware may be configured to selectively alternate between a full memory decompression mode and a partial memory decompression mode). In some such embodiments, automatic switching between full and partial decompression modes may be governed by (e.g., based on) one or more performance requirements (e.g., performance parameters) of the CPU, GPU (graphical processing unit), and/or other hardware or software data processing device or program for which the hardware decompressor is fetching data (e.g., device or program associated with the memory access read request received by the hardware decompressor).

In accordance with at least one embodiment, the hardware decompressor may be configured to have a one-time selection between full and partial decompression modes made during installation or activation. In addition, in accordance with at least one embodiment, the hardware decompressor may be configured to switch between the full and partial decompression modes based on a signal received from a CPU, GPU, and/or other device or software, which may or may not be associated with the memory access read request received by the hardware decompressor.

It should be noted that, in accordance with at least one embodiment, the hardware decompressor may have more than one internal buffer, and in such an embodiment, the decompressor can save the uncompressed (or decompressed) block image in one of the internal buffers. On a subsequent access to the same block the hardware decompressor can return a result without having to perform decompression and without reading the compressed image. In addition, in one or more other embodiments, the hardware decompressor may be designed to operate without an internal buffer.

Figure 5:
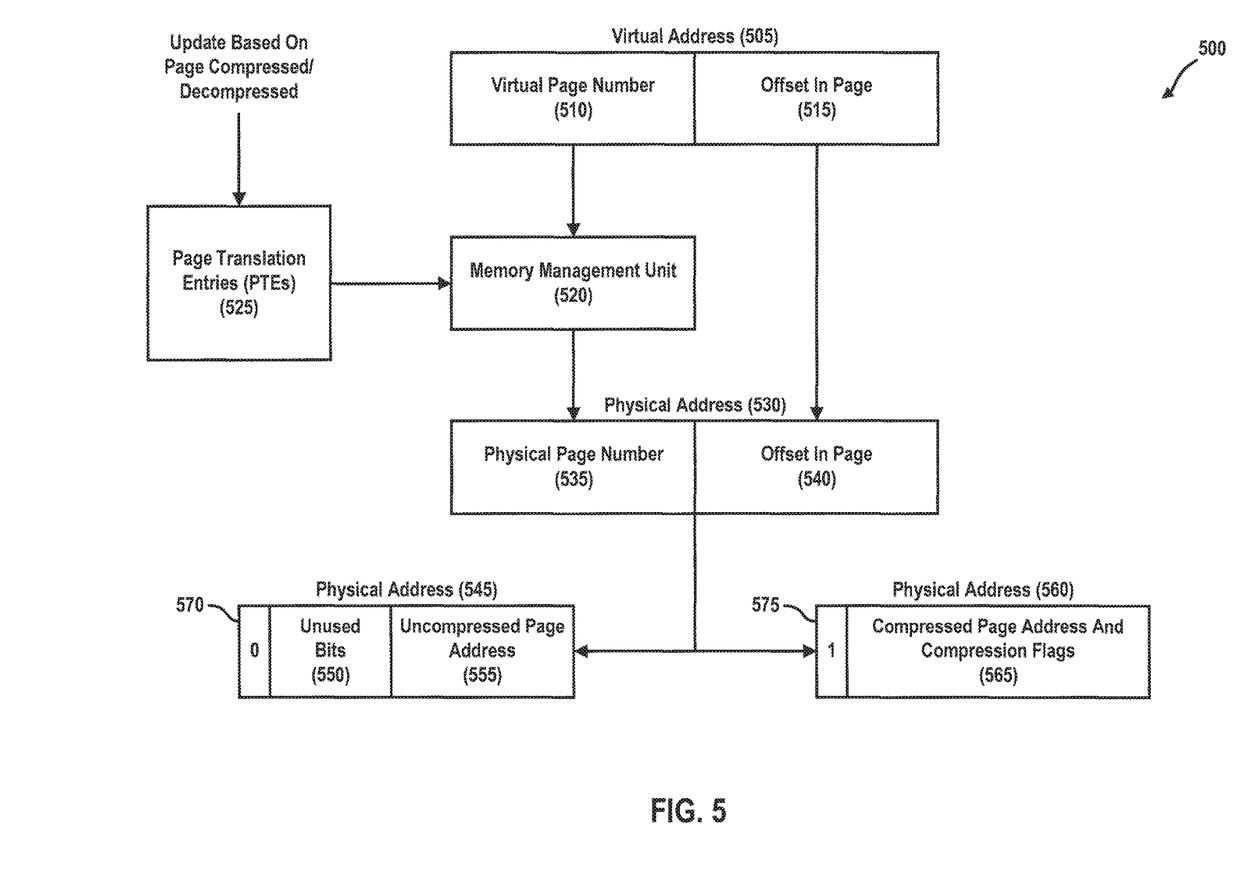
FIG. 5 is a block diagram illustrating an example scheme for encoding an address of compressed memory using existing page table data structures used by CPU or device for memory translation according to one or more embodiments described herein.

FIG. 5 is a scheme for encoding an address of compressed memory using existing page table data structures used by CPU or a device for memory translation, in accordance with one or more embodiments described herein. Illustrated is an example of how page tables operate, and how page tables can be extended to store additional information needed to locate a compressed block of memory. The virtual address 505 is supplied by CPU or a device as part of a memory request. The virtual address 505 consists of virtual page number 510 and offset inside the page 515. The memory translation unit 520 (memory management unit) consults page translation units 525 to convert virtual page number 510 into physical page number 535 and access protection bits (not shown).

The combination of physical page number 535 and offset inside page 540 (equal to offset in page 515 of virtual address 505) produces physical address 530. The physical address 530 can be presented in one of two formats: physical address 545 of uncompressed block, or physical address 560 of the compressed block. If physical address 530 is the physical address of the uncompressed block 545, then some of the bits of the address (550) may be unused, and the rest of the bits (555) provide the physical address of the uncompressed block that will be passed to the memory subsystem. If physical address 530 is the physical address of the compressed block 560, then bits 565 provide physical address of the compressed memory and additional flags needed for decompression (e.g., compression process or method). In accordance with at least one embodiment of the present disclosure, the hardware may decide which of the physical address formats (545, 560) is used based on, for example, the descriptor bit of each format (e.g., descriptor bit 570 for physical address 545, which is "0", and descriptor bit 575 for physical address 560, which is "1").

In addition to indicating whether the page is compressed, the unused bits of, for example, a page table entry, can be used to indicate the parameters of compression (e.g., the compression process or method). The compression of the blocks is orchestrated by the software. In accordance with at least one embodiment of the present disclosure, virtual memory pages may be used as compression blocks. This way, when the OS (operating system) kernel detects that a particular page is infrequently accessed, it can compress it to a separate buffer. After that, the OS kernel may change the page table entry to refer to the compressed image, and it may also set unused high bits of the physical address in the page table entry to indicate that the page is compressed (and the parameters of compression). The OS kernel may also mark the compressed page as "read-only." This may be done, for example, in one or more embodiments where the hardware decompressor is configured to handle read accesses only. In accordance with one or more other embodiments, the page would be decompressed on the write access.

In accordance with one or more embodiments, the hardware decompressor described herein may be configured or designed so as to permit the existing memory hierarchy to be used to access a compressed block larger than the requested size. Generally, the compression ratio is higher for larger blocks. The hardware decompressors described in accordance with one or more embodiments of the present disclosure eliminate (or substantially eliminate or minimize) software involvement in the read access to the compressed block. This improves performance and reduces energy consumption by removing software involvement in handling read accesses to compressed blocks. Such embodiments also do not need additional RAM to read the compressed block. This reduces the probability of entering what is known as a thrashing state, which results in poor user experience. Because the cost of access and probability of thrashing are radically lower with this approach, the one or more embodiments of the hardware decompressor described herein may allow a bigger portion of the memory to be compressed, enabling a cheaper system with a smaller amount of RAM.

It should also be noted that, in accordance with some embodiments of the present disclosure, instead of storing a decompressed block into an internal buffer, the hardware decompressor may store the decompressed block into a separate, potentially more energy-efficient or faster memory device. In this manner, accesses to the same block would require less decompression and reading of a compressed image.

Alternative implementations may place the decompression hardware in different levels of a cache hierarchy, and/or embed decompression hardware in the device that may need transparent decompression, or in between a non-cache memory buffer (e.g., local GPU memory) and cache/RAM. In other examples, the hardware decompressor may be part of the bus connecting different parts of a system-on-chip, may be embedded in the memory controller, or embedded in the memory chip. Such alternative implementations provide different tradeoffs in terms of design complexity, energy consumption, and performance. For example, embedding the hardware decompressor in the CPU cache controller and/or in devices that may need transparent decompression reduces the bandwidth requirements and energy consumption of the bus, since in such cases compressed data would have to be transferred over the bus instead of larger uncompressed data.

In accordance with one or more embodiments, the hardware decompressor described herein may be configured to use or employ different ways of storing information about compression. For example, instead of the high bits of page tables, the metadata about compressed data may be stored in memory description registers or bits of a software-managed translation-lookaside buffer (TLB), or some metadata specifically created to handle compression. Further alternative configurations may combine compression and deduplication by altering the metadata so that blocks with same content share the same compressed image.

In accordance with one or more embodiments of the present disclosure, instead of using a hardware decompressor such as that described herein, the methods and systems provided may utilize, for example, a special-purpose CPU capable of performing hardware decompression, or may utilize a piece of code running on the same CPU that causes the page miss. In accordance with some such embodiments, the cache line miss would produce a CPU exception similar to a page fault. The handler of this exception would then recognize that the exception was caused by an attempt or a request to access compressed data. The handler would then decompress the page into the internal buffer in the manner described herein, and then would restart the instruction that caused the miss in a special mode. In this special mode the data that the instruction would use would come from the internal buffer containing uncompressed data, instead of data at the address that caused the miss.

Among numerous other advantages and benefits, performing memory decompression with a hardware decompressor as described herein improves performance, reduces energy consumption, and reduces the cost of building the hardware by providing similar performance with smaller amount of installed RAM.

Figure 6:
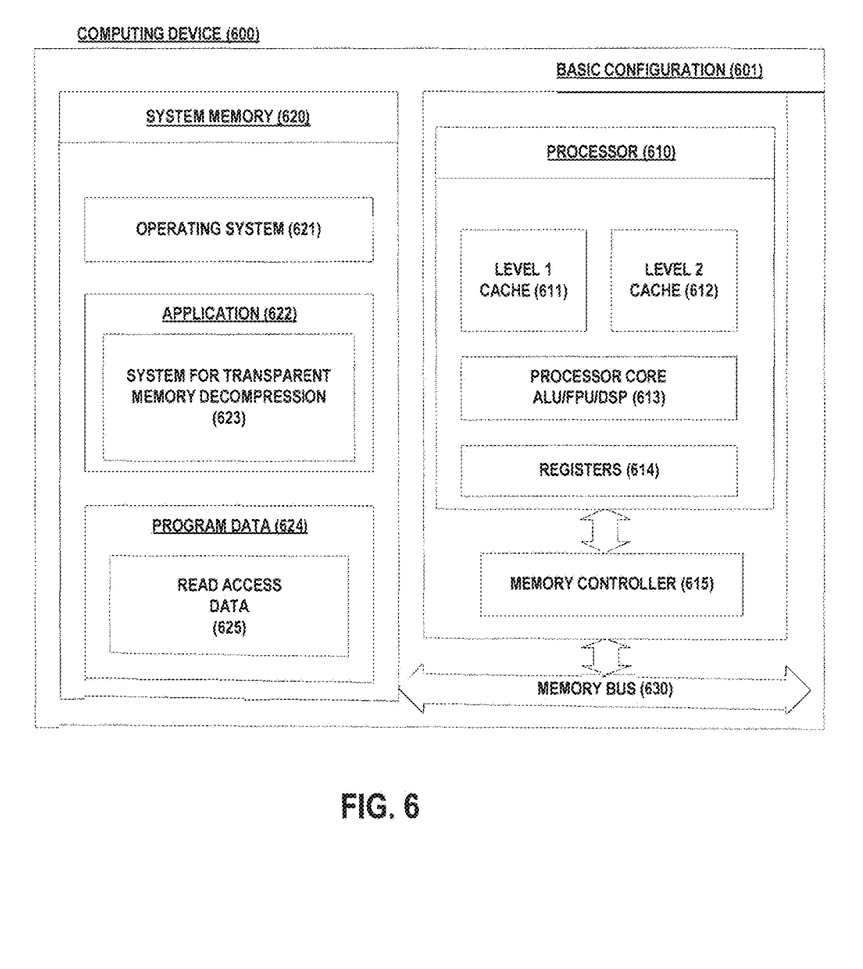
FIG. 6 is a block diagram illustrating an example computing device arranged for transparent memory decompression according to one or more embodiments described herein.

FIG. 6 is a high-level block diagram of an exemplary computing device (600) that is arranged for transparent memory decompression in accordance with one or more embodiments described herein. In a very basic configuration (601), the computing device (600) typically includes one or more processors (610) and system memory (620). A memory bus (630) can be used for communicating between the processor (610) and the system memory (620).

Depending on the desired configuration, the processor (610) can be of any type including but not limited to a microprocessor (µP), a microcontroller (µC), a digital signal processor (DSP), or the like, or any combination thereof. The processor (610) can include one more levels of caching, such as a level one cache (611) and a level two cache (612), a processor core (613), and registers (614). The processor core (613) can include an arithmetic logic unit (ALU), a floating point unit (FPU), a digital signal processing core (DSP Core), or the like, or any combination thereof. A memory controller (615) can also be used with the processor (610), or in some implementations the memory controller (615) can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include a system for transparent memory decompression (623). In accordance with at least one embodiment of the present disclosure, the system for transparent memory decompression (623) is designed to eliminate (or substantially eliminate or minimize) any involvement of software in handling read accesses to compressed blocks of physical memory. The system for transparent memory decompression (623) is capable of achieving improved performance and reduced energy consumption, as well as lowering costs by enabling simpler and faster hardware designs.

Program Data (624) may include stored instructions that, when executed by the one or more processing devices, implement a system (623) and method for transparent memory decompression. Additionally, in accordance with at least one embodiment, program data (624) may include read access data (625), which may relate to, for example, high order bits that indicate whether a requested portion of memory is already uncompressed, or if instead access to a compressed memory block is needed. In accordance with at least some embodiments, the application (622) can be arranged to operate with program data (624) on an operating system (621).

The computing device (600) can have additional features or functionality, and additional interfaces to facilitate communications between the basic configuration (601) and any required devices and interfaces.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (600).

The computing device (600) may be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. In addition, the computing device (600) may also be implemented as a personal computer including both laptop computer and non-laptop computer configurations, one or more servers, Internet-of-Things systems, and the like.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A hardware decompressor comprising:
   a dedicated storage medium comprising an internal buffer, the internal buffer local to the dedicated storage medium and not a physical computer memory; and
   a hardware device, wherein the hardware device is configured to:
      receive a memory access read request that causes a cache miss or page fault;
      determine whether data requested by the memory access read request is in a compressed memory block;
      responsive to a determination that the data requested by the memory access read request is not in the compressed memory block, forward the memory access read request to the physical computer memory;
      responsive to a determination that the data requested by the memory access read request is in the compressed memory block, determine whether the data from the compressed memory block has been previously decompressed and stored in the dedicated storage medium local to the hardware device;
      responsive to a determination that the data from the compressed memory block is stored in the dedicated storage medium, return the data from the dedicated storage medium in response to the memory access read request; and responsive to a determination that the data from the compressed memory block is not stored in the dedicated storage medium, allocate storage space in the dedicated storage medium;

read the data from the compressed memory block;

decompress the read data from the compressed memory block into the dedicated storage medium; and return the decompressed data from the dedicated storage medium in response to the memory access read request.

2. The hardware decompressor of claim 1, wherein the hardware device is configured to:

read the data from the compressed memory block until the data requested by the memory access read request is located; and decompress the read data from the compressed memory block into the dedicated storage medium only to the point where the requested data is fully retrieved.

3. The hardware decompressor of claim 1, wherein the hardware device is configured to:

determine whether the data requested by the memory access read request is in the compressed memory block by checking unused bits of page table structures that store information about virtual memory pages.

4. The hardware decompressor of claim 1, wherein the hardware device is configured to:

selectively alternate between a full memory decompression mode and a partial memory decompression mode.

5. The hardware decompressor of claim 4, wherein the hardware device is configured to:

alternate between the full memory decompression mode and the partial memory decompression mode based on one or more performance parameters of a device or program associated with the memory access read request.

6. The hardware decompressor of claim 4, wherein the hardware device is configured to:

alternate between the full memory decompression mode and the partial memory decompression mode based on a signal received from a device or program associated with the memory access read request.

7. A method for memory decompression, the method comprising:

receiving a memory access read request that causes a cache miss or page fault to occur;

determining whether data requested by the memory access read request is in a compressed memory block;

in response to determining that the data requested by the memory access read request is not in the compressed memory block, sending the memory access read request to a physical computer memory;

in response to determining that the data requested by the memory access read request is in the compressed memory block, determining whether the data from the compressed memory block has previously been decompressed by a hardware decompression device and stored in an internal buffer memory that is local to the hardware decompression device, the internal buffer memory being separate and distinct from the physical computer memory;

in response to determining that the data from the compressed memory block is stored in the internal buffer memory, returning the data from the internal buffer memory in response to the memory access read request; and in response to determining that the data from the compressed memory block is not stored in the internal buffer memory, allocating storage space in the internal buffer memory;

reading the data from the compressed memory block;

decompressing the read data from the compressed memory block into the internal buffer memory; and returning the decompressed data from the internal buffer memory in response to the memory access read request.

8. The method of claim 7, wherein the hardware decompression device is disposed between a processing unit and the physical computer memory.

9. The method of claim 7, further comprising:

reading the data from the compressed memory block until the data requested by the memory access read request is located; and decompressing the read data from the compressed memory block into the internal buffer memory only to the point where the requested data is fully retrieved.

10. The method of claim 7, further comprising:

determining whether the data requested by the memory access read request is in the compressed memory block by checking unused bits of page table structures that store information about virtual memory pages.

11. The method of claim 7, further comprising:

selectively alternating between a full memory decompression mode and a partial memory decompression mode.

12. The method of claim 11, wherein the alternation between the full memory decompression mode and the partial memory decompression mode is based on one or more performance parameters of a device or program associated with the memory access read request.

13. The method of claim 11, wherein the alternation between the full memory decompression mode and the partial memory decompression mode is based on a signal received from a device or program associated with the memory access read request.

14. A system for memory decompression, the system comprising:

system memory;

at least one processor; and a hardware decompression device configured to:

receive a memory access read request that causes a cache miss or page fault to occur;

determine whether data requested by the memory access read request is in a compressed memory block within the system memory;

in response to determining that the data requested by the memory access read request is not in the compressed memory block within the system memory, send the memory access read request to the system memory to answer the read request;

in response to determining that the data requested by the memory access read request is in the compressed memory block within the system memory, determine whether the data from the compressed memory block has previously been decompressed and stored in an internal buffer within a dedicated storage medium contained within the hardware decompression device that is not the system memory;

in response to determining that the data from the compressed memory block is stored in the internal buffer, return the data from the internal buffer in response to the memory access read request; and in response to determining that the data from the compressed memory block is not stored in the internal buffer, allocate storage space in the internal buffer;

read the data from the compressed memory block;

decompress the read data from the compressed memory block into the internal buffer; and return the decompressed data from the internal buffer in response to the memory access read request.

15. The system of claim 14, wherein the at least one processor is further caused to:

read the data from the compressed memory block until the data requested by the memory access read request is located; and decompress the read data from the compressed memory block into the internal buffer only to the point where the requested data is fully retrieved.

16. The system of claim 14, wherein the at least one processor is further caused to:

determine whether the data requested by the memory access read request is in the compressed memory block by checking unused bits of page table structures that store information about virtual memory pages.

17. The system of claim 14, wherein the at least one processor is further caused to:

alternate between a full memory decompression mode and a partial memory decompression mode.

18. The system of claim 17, wherein the at least one processor is further caused to:

alternate between the full memory decompression mode and the partial memory decompression mode based on one or more performance parameters of a device or program associated with the memory access read request.

19. The system of claim 17, wherein the at least one processor is further caused to:

alternate between the full memory decompression mode and the partial memory decompression mode based on a signal received from a device or program associated with the memory access read request.

20. The system of claim 14, wherein the hardware decompression device is disposed within a cache controller of the processor.

* * * * *